United States Patent [19]
Kent

[11] Patent Number: 4,830,260
[45] Date of Patent: May 16, 1989

[54] SOLDERING IRON TIP

[75] Inventor: George M. Kent, Sierra Madre, Calif.

[73] Assignee: Plato Products, Inc., Glendora, Calif.

[21] Appl. No.: 30,721

[22] Filed: Mar. 25, 1987

Related U.S. Application Data

[63] Continuation-in-part of Ser. No. 945,833, Dec. 23, 1986, abandoned.

[51] Int. Cl.⁴ .............................................. B23K 3/02
[52] U.S. Cl. ..................................... 228/54; 219/229
[58] Field of Search ................... 228/51, 54; 219/229, 219/258

[56] References Cited

U.S. PATENT DOCUMENTS 2,501,616  3/1950  Robinson ............................. 228/54
3,315,350  4/1967  Kent ..................................... 228/54
3,963,897  6/1976  Wakita ................................. 228/54

Primary Examiner—Kurt Rowan
Attorney, Agent, or Firm—Christie, Parker & Hale

[57] ABSTRACT

A soldering iron tip comprises a copper body with a layer of glass bonded on the surface. The portion of the body used for melting solder is not coated. The glass is opaque to infrared, has high, uniform and stable emissivity, helps prevent oxidation, limits wetting of the tip by solder, and is easily kept clean. The glass is readily applied to a soldering iron tip by melting a frit. Such a glass layer provides electrical insulation from a soldering iron and prevents leakage electric current from damaging sensitive components. A method is provided for measuring temperature of an article during soldering by applying a glass which absorbs infrared to a portion of the article and measuring infrared emittance from the glass during soldering.

10 Claims, 1 Drawing Sheet

SOLDERING IRON TIP

RELATED APPLICATION

This application is a Continuation-in-Part of U.S. patent application Ser. No. 945,833, filed Dec. 23, 1986, now abandoned.

BACKGROUND OF THE INVENTION

Soldering is widely used in electronics fabrication for interconnecting components. This may be machine soldering where substantial numbers of components are involved or many substantially similar products are produced so as to make automated soldering economical. There is still, however, a large amount of hand soldering of components. In such work a soldering iron is hand guided to the joint.

Whether machine soldering or hand soldering, it is often desirable to monitor the temperature of the joint or soldering iron. Too low a temperature may result in "cold" joints which do not provide long term reliability. Too high a temperature may result in damage to sensitive electrical components. To maintain an appropriate range of temperatures, it may be desirable to monitor the temperature of the tip of a soldering iron. Based on such feedback information, the temperature can be manually or automatically controlled.

Temperature of a soldering iron tip may be measured by inserting or attaching a thermocouple to the tip. This technique is to measure infrared emittance from the surface of the tip. There have been shortcomings in this technique since the emittance from the surface depends on important properties of the surface in addition to temperature. For example, the emissivity of the soldering iron tip is apt to change as the metal oxidizes. Tips are not necessarily uniform in surface emissivity due to variations in the manufacturing process. The surfaces are often plated with reflective metals that have low emissivity and high reflectance, making accurate measurements rather difficult and unreliable.

It is, therefore, highly desirable to provide a soldering iron tip having high and uniform emissivity and one that retains uniform emissivity during use.

High emissivity paints are sometimes applied to soldering iron tips, however, this affords a temporary solution. Such paint tends to flake off the surface after a period of use. It is also subject to easy removal during the frequent cleaning of soldering iron tips. Removal of excess flux from a tip is often by use of a wet sponge. The thermal shock of this cleaning is sometimes too much for brittle, relatively low adhesion paint coatings.

It is also desirable to keep molten solder from travelling too far up the tip. Many soldering iron tips are chromium plated in a region beyond the end since solder does not wet the chromium and can be kept confined to the end of the tip. Chromium plating is undesirable because of health and safety concerns in the plating shop. A low cost substitute for chromium plating is desirable.

Whether machine soldering or hand soldering, it is also desirable to prevent electrical leakage from reaching the soldering iron tip. This may be required when soldering sensitive electronic components. For example, USS. Department of Defense specification DOD-STD-2000-1A states "protective devices to prevent potential differences greater than 2 millivolts (mV) shall be used when voltage sensitive devices are being soldered."

Only the soldering iron tip contacts the leads to electronic components. Thus, electrical isolation of the tip from the balance of the soldering iron is desirable.

It would be particularly desirable to have a way of electrically isolating a soldering iron tip, controlling wetting of the surface by molten solder, and providing high and uniform resistivity, all with a single and inexpensive treatment.

SUMMARY OF THE INVENTION

There is, therefore, provided in practice of this invention according to a presently preferred embodiment a soldering iron tip in the form of a copper body which can be connected to a heat source such as an electric soldering iron. A layer of glass i bonded onto the surface of the body to provide high, uniform, stable emissivity, electrical insulation, and control of wetting of the surface. Preferably the glass is substantially opaque to infrared radiation and is applied over an iron group metal plating on the surface of the body. The glass should have a coefficient of thermal expansion sufficiently similar to copper and iron that it remains adherent upon heating to at least 500° C.

DRAWINGS

These and other features and advantages of the present invention will be appreciated as the same becomes better understood by reference to the following detailed description when considered in connection with the accompanying drawings wherein.

DETAILED DESCRIPTION

An exemplary soldering iron tip comprises an elongated, tapered copper body 10 having threads 11 at one end for threading into an electric soldering iron, for example. Many other conventional arrangements for connecting soldering iron tips to a heated soldering iron are also used. Some tips have an enlarged collar engaged by a threaded nut that screws onto the heating element of a soldering iron. A slotted tip may be secured around a heating element by a spring collar. A simple set screw may fix a tip inside a heating element.

Figure 1:
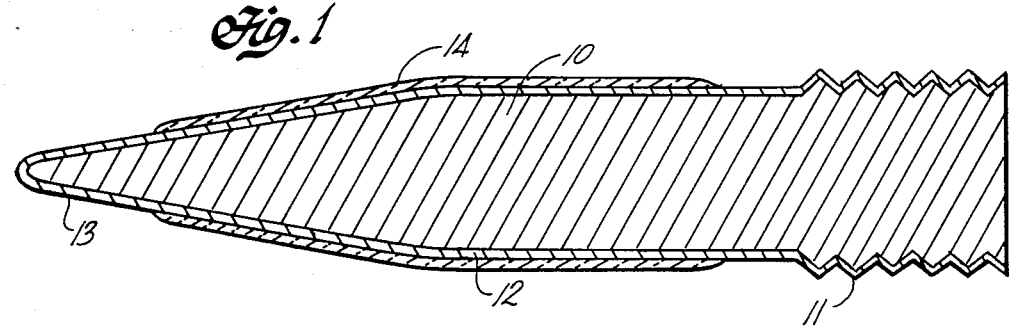
FIG. 1 illustrates in longitudinal cross section a soldering iron tip constructed according to principles of this invention.
Figure 4:
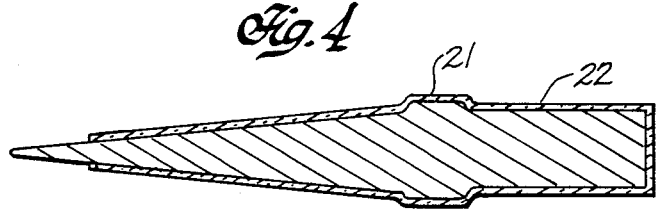
FIG. 4 illustrates another embodiment of soldering iron tip employing a layer of glass for electrical insulation.

Soldering iron tips are illustrated essentially schematically in FIGS. 1 and 4 since a very broad variety of soldering iron tips are used for specialized purposes. The geometry of the end of the tip is not critical to practice of this invention. In the embodiment of FIG. 1, the soldering iron tip has threads 11 for connection to a soldering iron. In the embodiment of FIG. 4, the soldering iron tip has an enlarged collar 21 part way between its ends and is connected to a soldering iron by a threaded collar (not shown). The threaded or collared end remote from the sharpened end 13 also serves as a means for receiving heat from an electric soldering iron or the like. The copper body conducts the heat to the sharpened end for heating joints to be soldered.

Soldering iron tips are usually made of copper because of its high thermal conductivity, low cost, and ease with which the desired geometry of tip can be formed. Copper is also readily wetted by typical solders used in electronics fabrication and is reasonably resistant to oxidation at soldering temperatures. To enhance this latter property, it is preferred to plate the copper body with a layer of iron 12 having a thickness of from about 100 to 500 microns. The iron plating is more resistant than copper to dissolution in molten solder so that a plated tip retains its original geometry better than a bare copper tip. The iron is also more resistant to oxidation than the copper and is readily wetted by the usual solders. Nickel, cobalt or alloy plating with iron group metals may also be used on some soldering iron tips.

Soldering is commonly conducted with a pointed or flattened end 13 at the end of the soldering iron tip. The pointed end of the soldering iron tip may be rounded, conical, chisel-like, or any of a variety of other special shapes. The pointed end is wetted with solder to make good thermal contact with the solder joint being made. Sometimes the balance of the soldering iron tip beyond the portion of the pointed end that needs to be wetted (typically two to ten millimeters) may be chromium plated to further inhibit oxidation and prevent wetting by the molten solder. Chrome plating is optional and in practice of this invention can be eliminated.

In practice of this invention a layer of glass 14 is bonded to the surface of the soldering iron tip in at least a portion of the body between the wettable pointed end 13 and the threads. A conventional infrared thermometer (not shown) receives radiation from the layer of glass to measure temperature of the soldering iron tip. It is preferred that the glass absorb substantially all infrared radiation so that the infrared thermometer "sees" the glass rather than the underlying substrate of copper or iron. Glass is unchanged due to the heating and cooling involved in soldering, and the emissivity of the glass therefore remains constant. Glass which is opaque to infrared radiation also has high infrared emissivity. Concomitant with high absorption of infrared, reflectivity of infrared is also minimized. These all contribute to accurate measurement of temperature by an infrared thermometer focused on the glass.

It is desirable to have a glass with a high coefficient of thermal expansion so as to approach the thermal expansion of the copper and iron substrate. This assures that the glass remains adherent to the soldering iron tip to at least 500° C., which is about as high as soldering iron tips get during typical soldering operations. The coefficient of thermal expansion of copper from room temperature up to 300° C. is about $17.7 \times 10^{-6}$ per degree Centigrade. Glasses with thermal expansion coefficients over the same temperature range of about 13 to $14 \times 10^{-6}$ per degree Centigrade are commercially available.

It is also desirable that the glass have good electrical insulating properties at all temperatures at which it will be used. The glass surface should be smooth so that contamination that might provide an electrical conduction path can be avoided. The glass should not be wettable by molten solder. Most glasses satisfy these requirements.

Typical glasses useful in practice of this invention include those often referred to as vitreous enamels. They are used for an underglaze or ground coat for porcelain enameled steel substrates. These glasses have been designed to have a high coefficient of thermal expansion and, coincidentally, they are opaque to infrared. Although these materials are referred to as glasses, they may under some circumstances at least partly crystallize during cooling or they may contain crystalline materials that do not dissolve in the molten glass. Thus, the coating on the soldering iron tip may not be a completely amorphous glass. The coating does retain a "glassy" surface which is desirable on a soldering iron tip. The glassy surface has no substantial porosity, although some bubbles dispersed in the glass may intersect the surface, and is quite smooth so that it can be readily wiped free of contamination that might get on the surface during use and change the effective emissivity.

A representative glass that may be used in practice of this invention is formed from a mixture of frits from Ferro Corporation, Cleveland, Ohio. Ferro frits 2212-4 at 30% by weight, XG629 at 20% by weight and XG736 at 50% by weight have been shown to form a satisfactory mixture. Color additives may be added if desired. The resultant glass is a borosilicate glass with high proportions of alkali metal oxides.

Another exemplary frit is GA-30 from Nippon Electric Glass Co., Ltd., Osaka, Japan. The latter is a borosilicate glass containing a high proportion of magnesium oxide.

A glass found suitable for use in practice of this invention has 30 parts Ferro Frit #2212-4, 20 parts Ferro Frit #XG629, 50 parts Ferro Frit #XG736, 10 parts of 325 mesh quartz, 7 parts Green Label clay, 0.25 parts borax, 0.25 parts bentonite, 0.063 parts magnesium carbonate, and 3 parts Ferro black stain #F6300. This is ground with 50% by weight water to make a frit suspension.

Other glasses absorbent of infrared and with relatively high coefficients of thermal expansion will be apparent to those skilled in the art.

The frit may be mixed with a temporary binder to retain it on the surface until firing. For example, the frit may be mixed with ethyl cellulose or a wax in an organic solvent. Frits carried in water with a gum or water soluble binder may also be used.

Glass is applied to the soldering iron tip by coating the desired surface area with a frit of the desired composition. The frit suspension may be applied to the surface by brushing, dipping or spraying. When coating the soldering iron tip with frit by dipping, the pointed end may be kept clean by a temporary rubber cap, a layer of wax, or the like. Alternatively, the entire soldering iron tip beyond the threads may be coated and the wettable pointed end wiped or washed clear of frit. Hand brushing of the desired areas with a small brush dipped in frit suspension has proved quite satisfactory. When a hollow tip is coated, the cavity may be filled with a frit suspension which is then poured out to leave a film on the surface.

The solvent may evaporate by air drying or may be vaporized upon initial gentle heating of the soldering iron tip to sinter or melt the frit. The binder, if any, vaporizes or oxidizes, leaving only the frit on the surface. In the sintering cycle, the frit is heated to its melting temperature and maintained at a sufficient temperature for a sufficient time for the glass to flow and form a continuous glassy layer on the soldering iron tip. Thickness of the glass layer on the soldering iron tip is typically in the range of from 0.1 to 0.3 millimeters.

Exemplary sintering temperatures are 800° to 900° C. for times up to about ten minutes. The heating rate to the sintering temperature may be up to about 40° C. per minute, and cooling rates may be at least that high without damage to the glass layer.

In an embodiment where only temperature measurement is required, most of the soldering iron tip between the threads or other connector and the wettable pointed end, is coated with glass. This is convenient from a manufacturing point of view and provides advantages in addition to providing a consistent surface for infrared temperature measurement.

Since the glass is not wetted by the solder and it serves to protect the underlying iron or copper from oxidation, a troublesome chromium plating step may be avoided. The coating with glass may be less costly than chrome plating and there are no environmental disadvantages. The glassy surface can also be quite easily wiped clean. The glass has a uniform and reliable infrared emissivity for accurate and stable temperature measurement.

Although in a preferred embodiment the major portion of the soldering iron tip is coated with glass, temperature measurements can be made on a much smaller area. An exemplary infrared thermometer may observe an area of only about one half millimeter diameter. Thus, by applying circle about one millimeter diameter on the surface, it is feasible to make temperature measurements where the location of the circle can be well known for focusing the infrared thermometer.

This same method of measuring temperature may also be used on other articles such as printed circuit boards, electrical components, or the like, during soldering. All one needs to do is apply an opaque glass to a portion of the article to be soldered, and measure the infrared emittance from that layer of glass.

Figure 2:
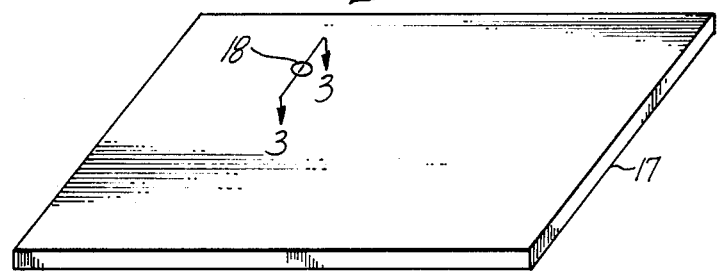
FIG. 2 illustrates axonometrically a printed circuit board including a glass spot for measuring temperatures in accordance with practice of this invention.
Figure 3:
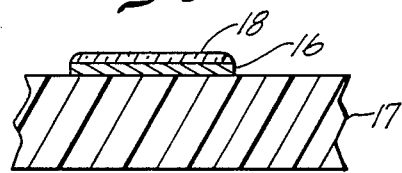
FIG. 3 illustrates in fragmentary transverse cross section the glass spot illustrated in FIG. 2.

Application of this method to a printed circuit board is illustrated in FIGS. 2 and 3. In this embodiment a thin layer 16 of high conductivity metal such as copper is placed on a printed circuit board 17 or the like. A layer of glass 18 is applied on the metal. As mentioned above, the resulting spot of glass on the surface of the printed circuit board or the like may be as small as one millimeter, although larger areas reduce the need for accuracy in pointing the infrared thermometer.

The metal may be applied to the printed circuit board or other article to be soldered by plating. For example, an area of a conductive line on a printed circuit board may receive a glass layer to serve as a source of infrared radiation for thermometry. The metal may be applied to the article by adhesive bonding, soldering, or it may be simply placed on the surface temporarily. A glass coated article may be surface mounted on a printed circuit board in the manner of an electrical component to provide an indication of the temperature of comparable components. Similarly, a glass coated simulated component may be mounted with simulated leads extending through holes in the PC board. It is preferred to employ a layer of metal beneath the glass since this enhances the ability to attach the glass to the substrate and provides a strengthening base on which the glass may be sintered.

All that is needed is reasonably good thermal contact between the measurement spot and the substrate, so that the spot is at about the same temperature as the article to be soldered. This technique for measuring temperature may be used, for example, on a wave soldered printed circuit board to assure that there is no overheating of the board and components thereon. Such a glass spot may be provided on a circuit component, various electronic instruments, and the like to assure that they are not overheated. Many such applications of this method will be apparent to one skilled in the art.

The technique for measuring temperature by infrared sensing of a glass spot of uniform emissivity on the surface of a printed circuit board or the like is much preferable to current use of meltable wax-like crayons commonly used to measure temperature during soldering. These are messy and may not indicate overheating unless crayons with more than one melting range are employed. Many applications of this technique will be apparent to one skilled in the art.

In the embodiment of FIG. 4, the soldering iron tip has a cylindrical shank 22 for connection to a soldering iron. The shank has a the raised collar 21 which is engaged by nut (not shown) for securing the tip to the soldering iron. The collar and at least the portion of the balance of the tip that may be contacted by the nut or parts of the soldering iron, are coated with a glassy layer. This provides electrical insulation so that the tip is assuredly free of stray electrical spikes which may damage sensitive electronic components. Such glassy electrical insulation on the portions of the tip that may contact the soldering iron in any way eases the electrical isolation requirements of the soldering iron itself.

The glass layer on the portion of the tip that secures to the soldering iron is so thin (0.1 to 0.3 mm) that its resistance to flow of heat is minimal. Further, since the glass layer has high emissivity, it also has high absorption of infrared, and heat transfer by radiation may be enhanced. Since the glass layer is easily kept clean, the connector portion of the soldering iron may also be kept clean.

Preferably, both the connector portion of the tip and a portion beyond the connector are coated with a layer of glass so that both electrical isolation and ability to measure temperature with infrared thermometers are obtained. By coating down to the region where the pointed end is wetted by molten solder, the wetted area of the tip can be controlled and a chromium plating step can be avoided.

What is claimed is:

1. A soldering iron tip comprising:
   a copper body;
   an iron group metal plating on the body;
   means for connecting one end of the body to a heat source; and
   a surface layer of glass absorbent to infrared radiation bonded on the iron group metal on the plated portion of the body between the ends, leaving a portion of the plated surface at the other end of the body exposed for wetting by solder.

2. A soldering iron tip according to claim 1 wherein the glass layer covers the surface of the soldering iron tip except for a solder wettable end of tee soldering iron tip.

3. A soldering iron tip according to claim 1 wherein the glass is substantially completely absorbent to infrared radiation.

4. A soldering iron tip according to claim 1 wherein the glass has a sufficiently similar coefficient of thermal expansion to copper that the glass remains adherent upon heating between room temperature and at least 500° C.

5. A soldering iron tip according to claim 1 wherein the glass layer covers the means for connecting the body to a heat source.

6. A soldering iron tip comprising:
- a copper body-having means at one end for receiving heat from a heat source and means at the other end for heating a joint to be soldered;
- an adherent layer of glass absorbent to infrared radiation on at least a portion of the surface of the body; and
- an iron group metal plating on the body, the glass coating a portion of the plating and bonded thereto.

7. A soldering iron tip according to claim 6 wherein the glass layer covers the surface of the soldering iron tip except for the ends.

8. A soldering iron tip according to claim 6 wherein the glass has a sufficiently similar coefficient of thermal expansion to copper that the glass remains adherent upon heating between room temperature and at least 500° C.

9. A soldering iron tip according to claim 6 wherein the glass layer covers the means for receiving heat from a heat source.

10. A soldering iron tip according to claim 6 wherein the glass layer covers all of the tip except for the means at the end for heating a joint to be soldered.

* * * * *